United States Patent Office 2,996,515
Patented Aug. 15, 1961

2,996,515
METHOD FOR PRODUCING PHOTO-PEROXIDES
Richard N. Moore, El Dorado, Ark., and Ray V. Lawrence, Lake City, Fla., assignors to the United States of America as represented by the Secretary of Agriculture
No Drawing. Filed Apr. 16, 1957, Ser. No. 653,255
3 Claims. (Cl. 260—340.3)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of peroxides including hydroperoxides from rosin acids or neutralized rosin acids containing conjugated dienic groupings.

The peroxides produced in accordance with this invention are useful as catalysts for the same polymerizations as described in application Serial No. 496,085, filed March 22, 1955, now Patent No. 2,775,578.

The process of this invention is carried out by passing an excess of an oxygen containing gas through the rosin acid or neutralized rosin acid to which a sensitizing organic dye has been added, while illuminating the mixture with artificial light (incandescent or fluorescent) or sunlight.

Products produced by the direct, non-photochemically induced oxygen or air oxidation of the rosin acids are dark colored heterogeneous mixtures formed in low yield. No more than about ten mole percent concentration of rosin acid peroxide can be prepared by processes other than photochemically induced oxidation since at this concentration the rate of decomposition of the peroxide equals the rate of peroxide formation.

In accordance with this invention, carboxylic acids such as abietic acid, neoabietic acid, levopimaric acid, palustric acid, and the derivatives of these acids such as the esters and the salts, can be photochemically oxidized to produce, in high yield, compounds that contain active oxygen (peroxides).

The photochemical oxidation reaction of this invention is applicable to conjugated dienic rosin acids, the esters of conjugated dienic rosin acids, and the salts of conjugated dienic rosin acids. Moreover, since the carboxyl group does not enter into the oxidation reaction or affect the oxidation reaction in any way except to the extent that the ability of the carboxyl grouping to form soluble derivatives can influence the choice of the solvent to be employed, when use of a solvent is dictated by the physical characteristics of the starting material (i.e. starting material a solid at the temperature selected for the photochemical oxidation reaction), the process of this invention is applicable to any compound that contains a reactive conjugated diene grouping. Neoabietinol, levopimarinol or the corresponding hydrocarbon compounds, for example, can be photochemically oxidized with equivalent results by this process.

Satisfactory solvents for use in the practice of this invention, where use of a solvent is indicated, are water, alcohols, ketones or any polar or semi-polar solvent for the conjugated dienic material being subjected to photochemical oxidation.

When use of a solvent is indicated for the photochemical oxidation process of this invention, the solvent in addition to possessing good solvent power for the conjugated dienic material, must transmit the active wavelengths of light which are from about 2000 to 7000 A and be inert toward the conjugated dienic material and the active oxygen compounds produced by the process.

The temperature at which the photochemical oxidation process of this invention is to be carried out can be room temperature (20–30° C.) or below. The operational temperature of the process is largely a matter of convenience. Photochemical oxidation processes are accelerated only to a slight degree by an increase in temperature. However, high temperatures should be avoided to prevent undesirable side and secondary reactions which are accelerated by increases in temperature.

Temperatures higher than room temperature can be employed for operational convenience if the pH of the reaction is kept at or near to pH 7, but as indicated above, the yield of active oxygen product will be less at the higher temperatures due to side and secondary reactions.

The pH at which the photochemical oxidation is best carried out is pH 7 or below since the oxidation reaction is more rapid at lower pH and furthermore secondary reactions are induced by an excess of alkali. The stability of the conjugated dienic material undergoing photochemical oxidation must, of course, be considered when choosing the optimum pH for a particular reaction. In the case of levopimaric acid, excessive amounts of mineral acid are not desirable because isomerization reactions may be induced. Also, as shown in Example 7 below, the photochemical oxidation of the alkali metal salts of levopimaric acid in the presence of an excess of alkali leads to a base catalyzed rearrangement of the peroxide salt, as described in copending application Ser. No. 653,256, filed April 16, 1957, now Patent No. 2,899,463.

The rate of oxidation is basically limited by the intensity and characteristics of the light source, and is independent of the concentration of the rosin acids over a wide range of concentration. No increase in oxidation rate is obtained by employing very high rosin acid concentrations, but side reactions become competitive with the oxidation reaction and some reduction in yield of peroxides results. Dilute solutions will therefore be commonly employed in the practice of this invention. Low rosin acid concentrations may be maintained by addition of the rosin acids at a suitable rate to the solution as the reaction progresses, so that the final product is quite concentrated with respect to peroxides.

Any gas that contains free oxygen and is of itself inert under the conditions of the photochemical oxidation reaction can be used to carry out the process of this invention. It is essential that an excess of oxygen be kept dissolved in the reaction mixture during the photochemical oxidation process in order to prevent undesirable side reactions such as photochemical isomerization, the latter brought about by a deficiency of oxygen during the process operation. Any efficient method of agitation such as stirring or bubbling the oxygen containing gas through the reaction mixture can be used to maintain an excess of oxygen gas dissolved in the reaction mixture. Because it is desirable to maintain an excess of oxygen in the reaction mixture there is some advantage in the use of pure oxygen and in the use of pressures greater than atmospheric for carrying out this reaction.

The choice of the material to be used as a photo-sensitizer for the photochemical oxidation reaction depends in large measure on the other reaction variables, the spectral characteristics and intensity of the light being used, the light transmission characteristics of the reaction mixture and the reaction container and the quantum efficiency of the photosensitizer.

The choice of concentration of the photosensitizer is dictated by the same variables plus its own transmittancy of active light wavelengths and the dimensions of the reaction vessel. The concentration of the photosensitizer can be adjusted along with the other variables to achieve the most economical compromise between the use of light and of photosensitizer material. The following photosensitizers have been found to function satisfactorily under the conditions described: rose bengal, methylene blue, erythrosin, eosin, retene quinone, 1,2-napthoquinone, chlorophyll, and fluorescein.

The following examples illustrate the process of photochemically oxidizing carboxylic acids and derivatives of carboxylic acids that contain a conjugated dienic grouping to produce active oxygen compounds.

*Example 1*

A cylindrical Pyrex vessel containing 15.1 g. of levopimaric acid, 2.0 g. of sodium hydroxide, 0.0225 g. of eosin, and sufficient 95% alcohol to produce 450 ml. of solution was irradiated by a 15 watt fluorescent lamp while a stream of oxygen was passed through the solution at a rate sufficient to keep the solution saturated with respect to oxygen. The optical rotation of the solution changed from $[\alpha]_D -276°$ to $[\alpha]_D +67°$ in 42 hours based on the original concentration of levopimaric acid. The peroxide, 6,14-peroxy-Δ7(8)-dihydroabietic acid, having the formula,

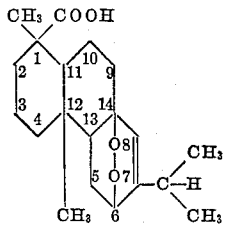

was isolated essentially free of the sensitizer and in a high state of purity by removing most of the alcohol by vacuum distillation, treating the pot residue with 200 ml. of acetone, and filtering out the precipitated sodium salt of the peroxide. The recovery of the purified salt of the peroxide was 11.60 g. or 65% of the theoretical yield. The salt was dissolved in a little alcohol and acidified with dilute acetic acid. The free rosin acid peroxide crystallized when the alcohol was diluted with a little water. After recrystallization once from aqueous alcohol the peroxide melted at 152–154° C. and weighed 7.43 g. The numbering in the above formula is based on Simonsen, "The Terpenes," vol. III, page 374 (Second edition; the University Press, Cambridge; 1952).

*Example 2*

A crude sample of levopimaric acid photoperoxide obtained under oxidation conditions similar to those described under Example 1, was purified by precipitation from alcohol solution with 2-amino-2-methyl-1-propanol. The precipitate was white after two recrystallizations from ethanol and had a specific optical rotation of +77.1° (1% in ethanol). The amine addition compound was slurried in ether and acidified with dilute acetic acid. The ether layer was separated, washed several times with water, dried over anhydrous sodium sulfate and filtered. The ether was then evaporated from the filtrate and the residue was recrystallized once from alcohol-water. The peroxide purified in this manner melted at 158–159° C., had a neutral equivalent of 334 and a specific optical rotation of +101° (1% in alcohol). Analysis for carbon and hydrogen content was in good agreement with the calculated values for an intramolecular peroxide of formula $C_{20}H_{30}O_4$. The peroxide when treated with methyl magnesium iodide, liberated 1 mole of methane per neutral equivalent and therefore contained no active hydrogen other than the one present in the carboxyl group.

*Example 3*

A sample of levopimaric acid photoperoxide from Example 2 was dissolved in ether and treated with a slight excess of diazomethane. The methyl ester of the peroxide readily crystallized after removal of the solvent under vacuum, and melted at 100–101° C. after recrystallization from aqueous alcohol. It had $[\alpha]_D +93.5°$ (2% in alcohol) and its carbon and hydrogen content was found by analysis to be in good agreement with an empirical formula of $C_{21}H_{32}O_4$. The infrared absorption spectrum of the methyl ester showed no characteristic O—H stretching band in the region of 3 microns.

*Example 4*

A solution containing 0.604 g. of methyl levopimarate ($[\alpha]_D -270°$, $\lambda_{max}^{alc}$ 272 millimicrons α 18) and 5 mg. of eosin in 100 ml. of 95% ethanol in a 1 by 10 inch test tube was aerated with air presaturated with alcohol and irradiated by a 15 watt fluorescent lamp. After 10 hours reaction the $[\alpha]_D$ was constant at +83° (based on the charged weight). The oxidation was quantitative since the ultraviolet absorption spectrum showed no characteristic absorption between 220 and 320 millimicrons. The alcoholic product solution was diluted with a large volume of water and extracted with ether. The ether extract was dried over anhydrous sodium sulfate, filtered and the ether was removed by distillation. The residue (0.62 g.) melted at 96–98° C. after two recrystallizations from alcohol-water. The melting point was not depressed when the ester was admixed with an equal amount of the ester obtained under Example 3.

*Example 5*

A solution containing 28.0 g. of levopimaric acid and 0.28 g. eosin in 2.8 liters of 95% ethanol was charged to an oxidation vessel consisting of concentric tubes, the outer tube being 7.5 by 125 cm. with a sintered glass bottom, and the inner tube being 4.5 by 130 cm. and containing a 40 watt fluorescent lamp. A vigorous stream of air bubbles was passed through the alcoholic solution and the fluorescent light was turned on. After two hours the ultraviolet spectrum showed that only 34% of the levopimaric acid remained unoxidized. This amounts to a conversion of 231 g. of levopimaric acid per kilowatt hour of power.

*Example 6*

In order to study the variables affecting the photochemical oxidation of the abietic type resin acids, a set of four cylindrical Pyrex test tubes of 2.8 cm. outside diameter and 25 cm. long was obtained. The tubes were fitted with reflux condensers and a sintered glass pencil type gas inlet near the bottom of each tube. Each tube was masked with opaque paper so that only a cylindrical center section 140 mm. long was exposed to light. Photochemical oxidation in quadruplicate, of alcoholic solutions of 0.02 molar levopimaric acid sensitized by 50 mg. of eosin per liter gave a maximum difference in observed optical rotation of 0.07° during the reaction. When no sensitizer was employed, the optical rotation of the levopimaric acid remained unchanged during 14 hours of irradiation and aeration. When the concentration of eosin was increased from 50 mg. per liter to 100 mg. per liter, the rate of change in $[\alpha]_D$ was increased from 52.2° per hour to 59.4° per hour.

*Example 7*

Four 100 ml. solutions in 95% ethanol each containing 0.002 mole of levopimaric acid and 5 mg. of eosin and containing also in (1) 0.000 mole of NaOH, in (2) 0.001 mole of NaOH, in (3) 0.002 mole of NaOH, and in (4) 0.003 mole of NaOH, were prepared and placed in the four test tubes described under Example 6. The tubes were irradiated by a 15 watt fluorescent lamp while a stream of gaseous $O_2$ was bubbled through. The changes in the optical rotations of the first three tubes showed that the reaction was not altered by addition of up to 1 equivalent of NaOH per equivalent of levopimaric acid. The reaction in tube (4) was altered by the presence of excess NaOH, as further described in the aforementioned Patent No. 2,899,463.

Example 8

A number of oxidations were conducted using 100 ml. of solution in 95% ethanol containing 0.002 mole of levopimaric acid and various sensitizers. The reactions were conducted in the tubes described in Example 6 and a 15 watt fluorescent lamp was employed as a light source. The oxidation was found to be sensitized by rose bengal, methylene blue, erythrosin, eosin, retene quinone, 1,2-napthoquinone, alcohol soluble chlorophyll and fluorescein. No reaction occurred in the absence of sensitizer.

Example 9

2.8 liters of 0.02 molar neoabietic acid in 95% ethanol containing 50 mg. of eosin per liter was oxidized in the oxidation vessel described in Example 5 using air as the oxidant. Analysis of the solution after 6.5 hours reaction showed it to contain 1.82 equivalents of active oxygen per mole of neoabietic acid charged.

Example 10

100 ml. of a solution of 0.02 molar neoabietic acid in 95% ethanol containing 5 mg. of eosin was aerated and irradiated as described in Example 6. Analysis of the solution after 20 hours reaction showed it to contain 2.02 equivalents of active oxygen per equivalent of neoabietic acid charged.

Example 11

100 ml. of a solution containing 1.00 g. of commercial pine gum and 5 mg. of eosin in 95% ethanol was photochemically oxidized in the manner described in Example 6. Analysis of the oxidate after 25 hours reaction showed that it contained at least 1.94 milliequivalents of active oxygen. The actual active oxygen content must have been appreciably greater than was shown by analysis since the pine gum originally contained about 25% levopimaric acid which yields a peroxide which liberates less than one eq. of iodine per mole, under the analytical conditions.

Example 12

100 ml. of a solution containing 1.00 g. of commercial WW grade gum rosin and 5 mg. of eosin in 95% ethanol was oxidized in the manner described in Example 6. Analysis of the solution after 24 hours reaction showed it to contain at least 2.06 milliequivalents of active oxygen. Assuming the average molecular weight of rosin to be 302, this would equal 0.62 atoms of oxygen per molecule.

Example 13

100 ml. of a solution containing 0.604 g. of abietic acid and 5 mg. of eosin in 95% ethanol was oxidized in the manner described in Example 6. Analysis of the solution after 11 hours reaction showed it to contain 0.53 milliequivalents of active oxygen per mole of consumed abietic acid.

Example 14

100 ml. of a solution containing 5 mg. of eosin and 0.604 g. of a mixture of resin acids comprised of 40% palustric acid, 40% abietic acid, 14% neoabietic acid and 7% non-conjugated acids in 95% ethanol was oxidized in the manner described in Example 6. Analysis of the solution after 7.0 hours showed it to contain 1.51 milliequivalents of active oxygen and no palustric acid.

Example 15

A reaction vessel was constructed of two concentric glass tubes, mounted vertically, the outer tube being 4.28 cm. in diameter and 54 cm. in length and fitted at the bottom with a sintered glass gas inlet and the inner tube being 3.48 cm. in diameter and 55 cm. in length, sealed at its lower end and containing a commercial 15 watt fluorescent tube type lamp. A solution comprised of 5.00 g. of palustric acid, 0.028 g. of rose bengel and sufficient 95% ethanol to give a total volume of 280 ml. was charged to the intertubular space of the reaction vessel. The solution was sparged vigorously with alcohol saturated air and irradiated by the 15 watt lamp for two hours. The reaction temperature was in the range of 25° to 40° C. The destruction of the palustric acid chromophore is shown by the disappearance of the absorption maximum at a wavelength of 266 millimicrons.

| Reaction time, minutes: | $\alpha$ at 266 m$\mu$ |
|---|---|
| 0 | 23.6 |
| 20 | 18.3 |
| 40 | 12.5 |
| 60 | 5.5 |
| 80 | 0.6 |
| 100 | 0.6 |
| 120 | 0.6 |

The peroxidic product was recovered by dilution of the alcoholic solution with a large volume of water and extraction into ether. The ether was removed by vacuum distillation, and the peroxide was dissolved in 50 ml. of acetone and precipitated as the 2-amino-2-methyl-propanol salt. Recrystallization of the salt three times from acetone gave 2.90 g. of white needles. The peroxide was freed of the amine and crystallized. A fraction of the crystalline peroxide, which melted with decomposition at 116°, showed $[\alpha]_D^{25}$ —70° (2% in ethanol) gave a methyl ester which could be purified by recrystallization from methanol. The purified methyl ester showed $[\alpha]_D^{25}$ —76° (2% in ethanol), melted at 125–126° C., and liberated 1.2 equivalents of iodine per mole of sample in 1 hour in acidic potassium iodide solution. The peroxide was stable toward alkali, showed no selective ultraviolet absorption between 220 and 320 millimicrons, contained no alcoholic hydroxyl group and was found by analysis to have the composition $C_{21}H_{32}O_4$. The peroxide was therefore the product of 1,4-addition of oxygen to the conjugated dienic grouping in palustric acid, or 7,13-peroxy-$\Delta 8(14)$-dihydroabietic acid, having the formula,

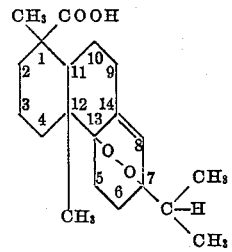

As in Example 1, above, the numbering in the formula is based on Simonsen, "The terpenes."

Example 16

A solution containing 2.19 g. of levopimaric acid and 2.0 ml. of tertiary-butyl alcohol was placed in a small glass tube fitted with a sintered glass oxygen inlet, and sparged with oxygen for several hours. The oxidate was taken up in a little ether and the oxidized resin acids were extracted by dilute aqueous sodium hydroxide. The alkaline extract was then acidified by acetic acid and the oxidate was re-extracted into ether solution. Removal of the ether from the oxidate by vacuum distillation left a yellow glassy residue. The oxidate contained 0.014 atom of active oxygen per molecule of resin acid and its ultraviolet absorption spectrum showed maxima at the following wavelengths (millimicrons), with the indicated specific extinction coefficients ($\alpha$) in ethanol solution: 235, ($\alpha$) 10.1; 243, ($\alpha$) 11.1; 252, ($\alpha$) 9.2; 267, ($\alpha$) 3.8; 276, ($\alpha$) 3.7. The nature of the absorption spectrum shows that the levopimaric acid was oxidized and isomerized to a complex mixture during air oxidation by the free radical autocatalytic mechanism. This illustrates the difference between ordinary autoxidation of rosin acids by the free radical autocatalytic process and the photo-sensitized process of this invention.

While the foregoing examples have shown the photochemical oxidation reaction of this invention applied to the free acids, their methyl esters and their sodium salts, any derivative of the acids in which the double bond structure is unchanged, can be oxidized. For instance the ethyl, propyl, butyl or other alkyl esters or the aryl or aralkyl or hydroxy alkyl esters, or the esters with polyhydric alcohols such as glycerol or ethylene glycol can be oxidized with equivalent results.

What we claim and desire to protect by Letters Patent is:

1. 6,14-peroxy-$\Delta$7(8) dihydroabietic acid.
2. The methyl ester of 6,14-peroxy-$\Delta$7(8) dihydroabietic acid.
3. 7,13-peroxy-$\Delta$8(14)-dihydroabietic acid.

References Cited in the file of this patent

UNITED STATES PATENTS

| Number | Name | Date |
|---|---|---|
| 698,741 | Eugen et al. | Apr. 29, 1902 |
| 1,752,693 | Ramage | Apr. 1, 1930 |
| 2,656,343 | Ritchie | Oct. 20, 1953 |
| 2,750,406 | Ritchie | June 12, 1956 |

FOREIGN PATENTS

| Number | Country | Date |
|---|---|---|
| 7,625 | Great Britain | May 18, 1901 |
| 777,501 | Great Britain | June 27, 1957 |
| 752,437 | Germany | Jan. 25, 1945 |
| 913,892 | Germany | May 13, 1954 |
| 906,347 | France | May 14, 1945 |
| 1,118,040 | France | Mar. 5, 1956 |

OTHER REFERENCES

Windaus et al.: J. Liebig's Annalen Der Chemie, vol. 460 (1928), pp. 225–30.

Windaus et al.: Ibid., vol. 508, p. 107 (1933).

Bergman et al.: Chemical Reviews, vol. 28 (1941), pp. 367–80.

Schenck et al.: Ibid., vol. 584, pp. 125–56 (1953).

Tobolsky et al.: "Organic Peroxides," Interscience, New York, 1954; pp. 24–28.

Harris: Encyclopedia of Chem. Technology, vol. 11 (eleven), pp. 786–94.